Patented Nov. 5, 1940

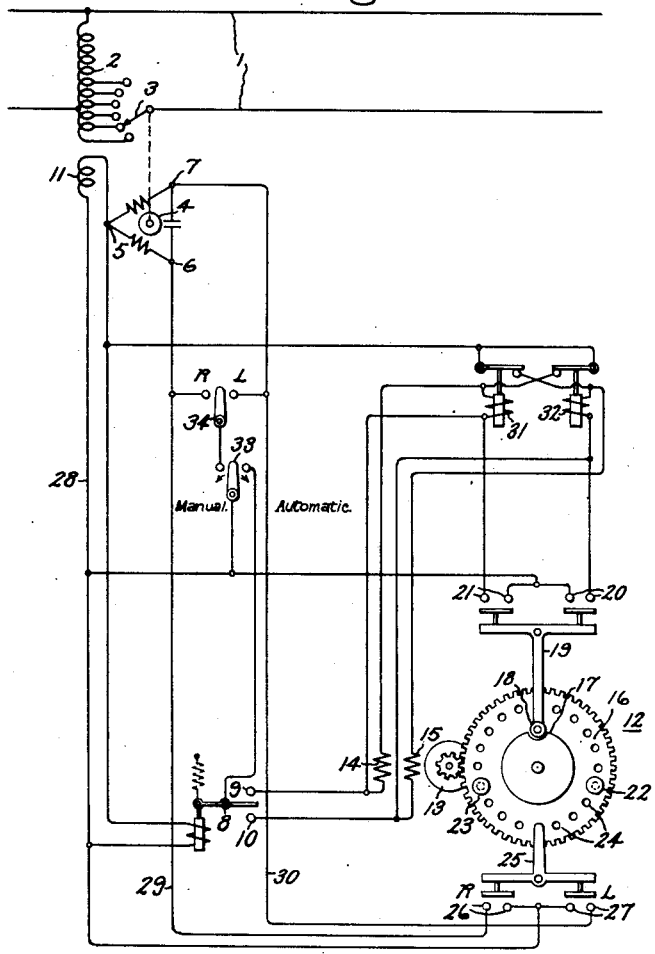
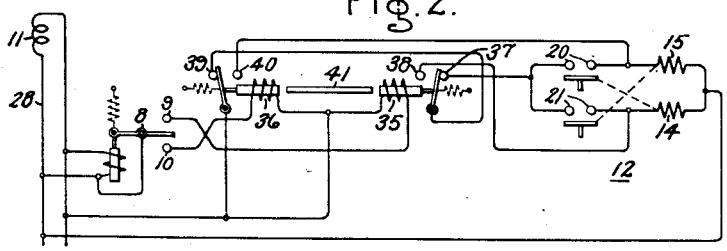
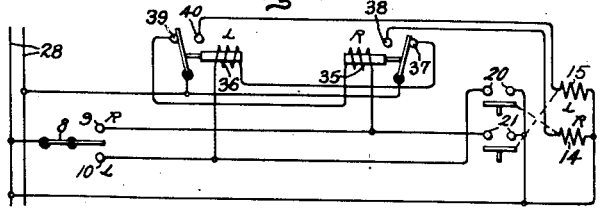

2,220,769

UNITED STATES PATENT OFFICE 2,220,769

TIME DELAY CONTROL SYSTEM

Thomas C. Lennox, Pittsfield, Mass., assignor to General Electric Company, a corporation of New York Application April 28, 1939, Serial No. 270,577

10 Claims. (Cl. 171—119)

This invention relates to time delay control systems and more particularly to an improved time delay control system for reversibly operated automatic regulators.

This is a continuation-in-part of my application Serial No. 221,765, filed July 28, 1938, and assigned to the assignee of the present application.

It is now customary to provide many automatic regulators, such for example as reversible motor-driven step regulators for feeder circuits and automatically cotnrolled variable ratio power transformers, with time delay means between the primary control device and the regulator proper. This is in order to prevent unnecessary operation of the regulating mechanism when the regulated quantity fluctuates rapidly.

In accordance with this invention there is provided a novel control system of this character utilizing an electrically driven time delay relay having a neutral or normal position from which it is rotated or driven in one direction when the primary control device calls for an increase or raise of the regulated quantity and from which is driven or rotated in the opposite direction when the primary device calls for decrease or lower in the value of the regulated quantity. By means of this operation, the time delays for the raising and lowering operations may be separately adjusted so as to have different values if desired. Furthermore, the motor current for the time delay relay may be carried directly by the control contacts of the primary device without the use of interposing relays. The regulator operating means or driving motor, as the case may be, is controlled directly by contacts of the time delay relay without the use of interposing relays. The time delay relay is automatically run back to its neutral position under full applied voltage and at full power whenever the primary control device stops calling for an increase or decrease in the value of the regulated quantity.

An object of the invention is to provide a new and improved control circuit.

Another object of the invention is to provide a new and improved time delay control system for automatic regulators.

The invention will be better understood from the following description taken in connection with the accompanying drawing, and its scope will be pointed out in the appended claims.

In the drawing, in which like reference characters designate corresponding elements in the two figures, Fig. 1 illustrates an embodiment of the invention in which the operating current for the time delay relay is carried directly by the contacts of the main control device or regulating relay; Fig. 2 illustrates a modification in which a novel arrangement of interlocked auxiliary relays is connected between the primary control device and the operating means of the time delay relay; and Fig. 3 is a combination of Figs. 1 and 2.

Referring now to the drawing, and more particularly to Fig. 1, the invention is shown applied to a control circuit for an automatic voltage regulator for an alternating current power circuit 1. The regulator comprises a transformer 2 provided with a tap changing switch 3 for varying the transformer ratio, so as to regulate the circuit voltage. For driving switch 3 there is provided a reversible motor 4, shown by way of example as a conventional single phase, split phase capacitor motor having a common terminal 5, a raise terminal 6 and a lower terminal 7. The primary control device for the regulator is shown by way of example as a conventional voltage regulating relay 8 having a set of raise contacts 9 which are closed when the voltage of circuit 1 is below a predetermined value and having a set of lower contacts 10 which are closed when the voltage of the main circuit is above a predetermined value. The primary relay 8 is energized in accordance with the voltage of circuit 1 by means of an auxiliary winding 11 on the transformer 2. This auxiliary winding also supplies the necessary current for operating the motor 4.

Interposed between the primary relay 8 and the motor 4 is a time delay relay 12 having a reversible driving motor 13 provided with a winding 14 for operating it in one direction and a winding 15 for operating it in the other direction. The motor 13 drives a rotatable element 16, preferably through a reduction gearing. Carried by member 16 is a cam 17 cooperating with a cam follower 18 carried by a pivoted member 19 which controls two sets of directional seal-in contacts 20 and 21, respectively. The parts are illustrated in the normal or neutral position of the relay and the arrangement is such that if member 16 turns in a clockwise direction, directional seal-in contacts 20 will close, while if member 16 turns in a counter-clockwise direction, directional seal-in contacts 21 will close. Also carried by member 16 are a pair of pins or lugs 22 and 23 which may be adjustably positioned on the member 16 by means of a plurality of holes 24 formed therein. These pins cooperate with a pivoted member 25 for controlling normally open raise and lower contacts 26 and 27, respectively. Thus, if the motor 13 is operated long enough in a direction to rotate the member 16 in a clockwise direction, the pin 22 will engage the member 25 and close the raise contacts 26, while if the motor is operated for a long enough time so as to rotate the member 16 in the opposite direction, the pin 23 will engage the member 25 and close the lower contacts 27. These contacts control respectively forward and reverse operating connections for the motor 4, which may be traced from the common terminal of the motor through the auxiliary winding 11, a conductor 28, contacts 26 or 27, conductors 29 or 30, respectively, to the raise or lower terminals 6 or 7 of the motor 4.

In order to remove control from the voltage regulating relay 8 when it opens either of its sets of contacts after it has previously held them closed, so as to give time for the time delay relay to run back to its neutral position, there are provided a pair of normally closed interlocking relays 31 and 32 whose operating windings are connected in parallel with the motor windings 14 and 15 respectively. The contacts of each of these relays are connected in series circuit relation with the winding of the other relay and its parallel connected timer motor winding.

In order to render the control of the regulator selectively manual or automatic, a conventional transfer switch 33 is provided. In the manual position of this switch the raise and lower operation of the regulator driving motor 4 is directly under the control of a manual switch 34. As time delay operation is not needed when the regulator is manually controlled, the manual control switch 34 is not connected with the time delay relay 12.

If it is desired to protect the motor 13 of the time delay relay when pins 22 or 23 cause closure of contacts 26 or 27 respectively, conventional limit switches for opening the motor circuits at such times may be employed or else a suitable slip clutch or friction drive may be interposed between the motor and the element 16.

The operation is as follows: The parts are illustrated in the positions they assume when the voltage of the circuit 1 is normal. If now it is desired to control the regulator automatically, the transfer switch 33 is moved to its automatic position, thereby connecting the common contact of the voltage regulating relay 8 to one side of the supply winding 11. If now the voltage should fall below normal, the raise contacts 9 will close, thereby completing a circuit through the motor winding 14, and the relay winding 31 in parallel and through the normally closed contacts of the relay 32 to the other side of the supply winding 11. The energization of the motor winding 14 causes the element 16 to be rotated in a clockwise direction, whereupon the directional seal-in contacts 20 close immediately. These contacts are in parallel circuit relation with the lower contacts 10 of the voltage regulating relay but they are prevented from energizing the relay 32 and the motor winding 15 because the contacts of the relay 31 are open due to its prior energization. If the low voltage condition lasts as long as the timing out period of the time delay relay the raise contacts 26 will be closed, thereby energizing the motor 4 and causing it to drive the regulator in a direction to raise the voltage. As soon as the voltage has been increased sufficiently, the raise contacts 9 will separate, thereby immediately de-energizing the winding 14 and the relay 31. As soon as the relay 31 drops out and closes its contacts, the reverse direction controlling motor winding 15 and the relay 32 are energized through these contacts and the contacts 20 in series. This reverse operation will continue until the time delay relay reaches its illustrated neutral position, for not until that position is reached will the contacts 20 open. It is to be noted that during this run back or reverse operation of the time delay relay a second closing of the raise contacts 9 will produce no controlling effect because the circuit through these contacts is broken by the open serially-connected contacts of the now energized interlock relay 32.

If the voltage rises sufficiently above normal to cause closure of the lower contacts 10, the operation is just the opposite of that which has been already described in that winding 15 and relay 32 will immediately be energized, thus reversing the time delay relay which after a predetermined time will close its lower contacts 27 and reverse the motor 4, thereby causing the regulator to lower the main circuit voltage. The directional seal-in contacts 21 close immediately the relay 12 starts to operate but they can produce no controlling effect because the contacts of relay 32 are open. If now the lower contacts 10 are opened at any time during this reverse operation of the time delay relay, the relay 32 will immediately drop out and close its contacts thereby permitting the seal-in contacts 21 to take control of the run back of the relay by simultaneously energizing the interlock relay 31 and the forward motor winding 14.

In Fig. 2 the main power circuit 1, the regulating transformer 2, its operating motor 4, the time-delayed-closing motor-directional-controlling controls 26 and 27, the transfer switch 33 and the manual control switch 34 have been omitted so as to avoid duplication and render more easily understood the difference between Figs. 1 and 2. It should be understood, however, that all of these elements will preferably be used to make up a complete system controlled by the control elements shown in Fig. 2, in which complete system they will, of course, operate in exactly the same manner as in Fig. 1. The difference between Fig. 2 and Fig. 1 is that in Fig. 2 a pair of auxiliary interlocked relays 35 and 36 have been connected between the raise and lower contacts 9 and 10 of the primary regulating relay 8 and the elements of the time delay relay 12 in place of the interlocking relays 31 and 32 of Fig. 1 which are connected in parallel with the operating windings 14 and 15 of the time delay relay motor. These relays 35 and 36 are energized by the supply winding 11 under the control of the contacts 9 and 10 so that when the regulated voltage is low and the raise contacts 9 close, relay 35 picks up, and when the regulated voltage is high and lowering contacts 10 close, relay 36 picks up. When the voltage is normal and contacts 9 and 10 are both open, the relays 35 and 36 are in their illustrated normal positions. Relay 35 has a set of normally closed contacts 37 and a set of normally open contacts 38 which are so mechanically interlocked that they both cannot be closed at the same time. Relay 36 is provided with a similar set of contacts 39 and 40. The winding 14 of the motor for operating the time delay relay is energized by the supply winding 11 through the normally open contacts 38 of the raising auxiliary relay 35 and the normally closed contacts 39 of the lowering auxiliary relay 36 in series, and the motor winding 15 for operating the timer motor in the reverse direction is energized by the supply winding 11 through the normally open contacts 40 of the lowering relay 36. In this manner an electrical interlock is provided which prevents the simultaneous energization of both the windings 14 and 15. It will also be noted that it is the lowering relay 36 which has the master control so that the voltage will be lowered and not raised should both relays be in their actuated positions at the same time.

The run back circuit for the timer motor includes the normally closed contacts 37 and 39 in series so that whenever both the auxiliary relays 35 and 36 are de-energized, as will be their condition when the regulated voltage is normal, the run back circuit will be completed through whichever one of the run back controlling contacts 20 and 21 is closed. This, of course, depends upon the direction in which the regulator motor is operated during a time delay operation.

In order to render the completion of the run back circuit more reliable and positive at the proper time, the relays 35 and 36 are mechanically interlocked by a member 41. The arrangement is such that both relays cannot be in their actuated positions at the same time so that if one relay sticks in its actuated position and then the other relay is energized, the force tending to actuate the energized relay will ordinarily act through the member 41 to move the other relay to its deactuated position so that when the actuated relay is de-energized and drops out, the run back circuit will be completed.

The operation of Fig. 2, except for the differences described above, is in general the same as for Fig. 1. Thus, closing either the raise or lower contacts 9 or 10 will cause the timer motor windings 14 or 15 to be energized, thus causing the timer to be rotated in either the forward or reverse direction until the contacts 20 or 21 close, whereupon the operating motor will drive the tap changer in the proper direction to restore the voltage to normal and open, whichever one of the contacts 9 or 10 is closed. As soon as the contacts 9 and 10 are both open, the relays 35 and 36 drop out and complete the run back circuit for the timer through whichever one of the run back controlling contacts 20 and 21 has been closed. As soon as the timer returns to normal, the run back contacts open and the parts are restored to their illustrated positions.

However, there is one difference between the operation of Figs. 2 and 1 which should be noted. That is, that in Fig. 2 the main controller is not locked out and prevented from reversing the timer during the run back operation as is the case in Fig. 1. Under certain operating conditions one type of operation is desirable, whereas under other operating conditions the other type of operation is the most desirable.

If the locked out type of run back operation is desired when using a relay arrangement of the type shown in Fig. 2, the circuit may be modified as shown in Fig. 3. In this figure the run back controlling contacts 20 and 21 are connected respectively in parallel with the main control contacts 8—10 and 8—9 of the primary relay in a manner similar to the connections shown in Fig. 1. However, the control circuits for the relays 35 and 36 are each completed through the normally closed back contacts 39 and 37 respectively. In this manner, as soon as the primary relay stops calling for a raising operation of the regulator, the relay 35 will drop out and the relay 36 will immediately pick up through the run back contacts 20 and the back contacts 37 of the relay 35 in series. The opening of the back contacts 39 of the relay 36 will lock out the relay 35 so that a subsequent closing of the raise contacts 8—9 during a run back operation cannot cause operation of the raising auxiliary relay 35. In a similar manner the lowering auxiliary relay 36 will be locked out during a run back of the time delay under the control of the run back contacts 21.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In an automatic control system for a regulator, means for causing raising and lowering operation of a regulator, a source of current supply for said means, a main control device having raise and lower positions, a time delay relay having a motor for driving it in opposite directions from a neutral position, operating connections for causing said relay motor to operate in one direction from said normal position when said main control device is in its raise position and for causing said relay motor to operate in the opposite direction from said neutral position when said main control device is in its lower position, separate time delayed closing raise and lower contacts on said relay for connecting said regulator operating means to said source of current supply, and electrical connections for postively running said time delay relay back to its neutral position at full power whenever said main control device is between its raise and lower positions.

2. An automatic control system for step voltage regulators connected in power circuits comprising, in combination, a time delay relay having a motor provided with a forward rotation operating winding and a reverse rotation operating winding, a source of current supply, a voltage regulating relay having a voltage raising circuit closing position for causing connection of said forward rotation winding to said source of supply and having a voltage lowering circuit closing position for causing connection of said reverse rotation winding to said source of supply, said regulating relay also having an intermediate circuit opening position, a pair of normally opened contacts arranged to be closed as soon as said motor rotates in the forward direction from a normal position, a second pair of normally open contacts arranged to be closed as soon as said motor rotates in the reverse direction from said normal position, auxiliary relays for connecting said forward rotation winding to said source through the reverse-rotation-closing normally-open contacts when said regulating relay is in its intermediate circuit opening position and for connecting said reverse rotation winding to said source through the forward-rotation-closing normally-open contacts when said regulating relay is in its intermediate circuit opening position, and a set of time delay main control contacts for regulator operating means arranged to be actuated by said motor after a predetermined time of rotation in either direction.

3. In a time delay control system, a source of current supply, a pair of circuits, switching means comprising two sets of normally open contacts for respectively connecting said circuits to be energized by said source of current supply, a motor having a winding for causing it to rotate in a forward direction from a normal position connected in one of said circuits and having a winding for causing it to operate in the reverse direction from said normal position connected in the other of said circuits, a pair of normally closed relays each of which has its operating winding connected in circuit with a different one of said motor windings and having its contacts connected in circuit relation with the other relay winding and the motor winding which is in circuit therewith, a set of normally open contacts arranged to be closed by said motor whenever it rotates in a forward direction from its normal position connected in parallel with the contacts of said switching means which control the circuit containing the motor winding which operates the motor in the reverse direction, and a normally open set of contacts which are arranged to be closed by said motor whenever it rotates in the reverse direction from said neutral position connected in parallel with the contacts of said switching means which control the circuit containing the winding for operating the motor in the forward direction.

4. In a time delay control system, a source of current supply, a pair of circuits, switching means comprising two sets of normally open contacts for respectively connecting said circuits to be energized by said source of current supply, a motor having a winding for causing it to rotate in a forward direction from a normal position connected in one of said circuits and having a winding for causing it to operate in the reverse direction from said normal position connected in the other of said circuits, a pair of normally closed relays each of which has its operating winding connected in parallel with a different one of said motor windings, and having its contacts connected in series circuit relation with the other relay winding and its parallel connected motor winding, a set of normally open contacts arranged to be closed by said motor whenever it rotates in a forward direction from its neutral position connected in parallel with the contacts of said switching means which control the circuit containing the motor winding which operates the motor in the reverse direction, and a normally open set of contacts which are arranged to be closed by said motor whenever it rotates in the reverse direction from said neutral position connected in parallel with the contacts of said switching means which control the circuit containing the winding for operating the motor in the forward direction.

5. In a regulating system, a source of current supply, a main control device having normally open raise and lower contacts, a pair of circuits which are connected respectively to be energized by said source of current supply by the closure of said raise and lower contacts, a time delay relay having a neutral position and having a reversible motor for driving it in opposite directions from said neutral position, said motor having a winding for causing forward operation thereof connected in the circuit which is closed by said raise contacts and having a winding for causing reverse operation thereof which is in the circuit controlled by said lower contacts, a relay having an operating winding connected in parallel with the winding for causing forward motor operation and having a set of contacts which are closed when said winding is de-energized connected in the circuit controlled by said lower contacts, a relay having a winding connected in parallel with the motor winding for causing reverse operation and having a set of contacts which are closed when said relay winding is de-energized connected in the circuit controlled by said raise contacts, a set of normally open directional seal-in contacts connected in parallel with said set of lower contacts and arranged to be closed when said relay has been operated away from said neutral position in a forward direction, a set of normally open directional seal-in contacts connected in parallel with said raise contacts and arranged to be closed when said relay has been operated away from its neutral position in a reverse direction, and normally open regulator controlling contacts arranged to be closed respectively when said relay has been operated for a predetermined length of time in either direction away from its neutral position.

6. A regulator control system comprising, in combination, a main control device having normally open sets of separately closable raise and lower contacts, a source of current supply, normally de-energized auxiliary raise and lower relays connected respectively to be energized by said source through the raise and lower contacts of said main control device, each of said relays having a set of normally closed contacts and a set of normally open contacts, a time delay relay having a reversible motor provided with a forward rotation operating winding and a reverse rotation operating winding, separate sets of contacts which are open when said motor is in a neutral position and which close respectively when said motor starts to rotate in the forward direction or the reverse direction, a first circuit for connecting said forward rotation winding to said source through the normally closed contacts of both of said auxiliary relays and the normally open reverse rotation closing motor operating contacts in series, a second circuit for connecting said reverse rotation winding to said source through the normally closed contacts of both of said auxiliary relays and the normally open forward rotation closing motor operated contacts in series, a third circuit for connecting the forward rotation winding to said source through the normally open contacts of one of said auxiliary relays, a fourth circuit for connecting the reverse rotation winding to said source through the normally open contacts of the third auxiliary relay, and time delay actuated regulator controlling contacts operated by said motor after a predetermined amount of rotation thereof.

7. In a regulator control system, a set of normally open and normally closed contacts so interlocked that closing the normally open contacts opens the normally closed contacts and vice versa, a second similar set of contacts, an interlock between said sets of contacts for preventing simultaneous closing of both normally open contacts, a reversible motor driven time delay relay having time-delayed-closing regulator-operation controlling-contacts and substantially instantaneously-closing run-back-controlling contacts, a circuit controlled by the normally open contacts of one of said sets of contacts for energizing said motor for one direction of rotation, a second circuit controlled by the normally open contacts of the other of said sets of contacts for energizing said motor for the opposite direction of rotation, and a run back circuit for said motor controlled by the normally closed contacts of both of said sets of contacts in series with each other and in series with said run back controlling contacts.

8. In a regulator control system, a set of normally open and normally closed contacts so interlocked that closing the normally open contacts opens the normally closed contacts and vice versa, a second similar set of contacts, a reversible motor driven time delay relay having time-delayed-closing regulator - operation - controlling contacts and substantially instantaneously-closing runback-controlling contacts, a circuit controlled by the normally open contacts of one of said sets of contacts for energizing said motor for one direction of rotation, a second circuit controlled by the normally open contacts of the other of said sets of contacts in series with the normally closed contacts of the first mentioned of said sets of contacts for energizing said motor for the opposite direction of rotation, and a run back circuit for said motor controlled by the normally closed contacts of both of said sets of contacts in series with each other and in series with said run back controlling contacts.

9. A time delay control system for an automatic reversible regulator driving motor comprising, in combination, a primary relay, a pair of auxiliary relays each having main contacts which go from open to closed position when the relay is actuated and having interlocked contacts which go from closed to open position when the relay is actuated, circuits controlled by said primary relay for selectively actuating each auxiliary relay through the interlocked contacts of the other auxiliary relay, a reversible motor-driven time delay relay having two sets of normally open main control contacts which close respectively after said time delay relay has operated for a predetermined time in one direction or the other and being further provided with two sets of normally open run-back controlling contacts which close respectively as soon as said time delay relay operates in one direction or the other from a neutral position, circuits controlled respectively by the main contacts of said auxiliary relays for controlling the operation of said time delay relay away from said neutral position, said run-back controlling contacts being connected selectively to control the actuating circuits of said auxiliary relays, and circuits controlled by the main control contacts of said time delay relay for operating the regulator driving motor.

10. A time delay control system for an automatic reversible motor-driven regulator comprising, in combination, a reversible motor-driven time delay relay having a neutral position, a primary relay having raise, lower and normal circuit controlling positions, circuits for operating said time delay relay in opposite directions away from said neutral position when said primary relay is in its raise and lower positions respectively, circuits for reversibly operating said time delay relay toward said neutral position when said primary relay is in its normal position, interlocks for preventing said primary relay from reversing the direction of operation of said time delay relay when it is being run back toward said neutral position, and means responsive to predetermined amounts of operation of said time delay relay away from said neutral position for operating the driving motor of said regulator.

THOMAS C. LENNOX.